Patented Oct. 30, 1923.

1,472,385

UNITED STATES PATENT OFFICE.

WALTER ARTHUR BROWN, OF LOS ANGELES, CALIFORNIA.

PROCESS OF SEPARATING HYDROCARBONS FROM WATER.

No Drawing.  Application filed February 24, 1919.  Serial No. 278,729.

*To all whom it may concern:*

Be it known that I, WALTER ARTHUR BROWN, a citizen of the United States, residing at Los Angeles, in the county of Los Angeles, State of California, have invented new and useful Improvements in Processes of Separating Hydrocarbons from Water, of which the following is a specification.

This invention relates generally to processes for separating hydrocarbons and water from a mixture thereof, particularly from such mixtures as are known as emulsions; or from all hardly separable mixtures of water and oils of any kind, whether of crude petroleums or other nature in which the mixtures are caused by natural forces or whether of artificial oils, etc. in which the mixtures are caused in processes of manufacture, use, or other circumstances. And this particular invention relates more specifically to a method employing a mechanical precipitant.

I have found that the use of a mechanical precipitant, preferably a non-soluble finely divided earthy matter is of assistance in the practicing of such a process as is set forth in my Patent No. 1,309,794, granted July 15, 1919, in which I have generally set forth the use of such a mechanical precipitant and have claimed its use in combination with the heat and pressure method therein set forth and claimed. I have also found that the use of a mechanical precipitant is sometimes of practical assistance in causing separation where I use the solvent method which I have set forth in my co-pending application, Serial No. 278,728, filed Feb. 24, 1919. And furthermore I have found that by the proper use of certain kinds of mechanical precipitants I am enabled to separate and to cause the settling of water from an emulsion or other oil and water mixture without the aid of the heat and pressure process or the solvent process.

I prefer to utilize a mechanical precipitant composed of finely divided insoluble material, preferably heavier than the liquids. In practice, I find it most practicable to use as a precipitant either a dry fuller's earth or a dry finely divided fuller's earth or a finely divided clay, or smooth creamy mud made from such earth or clay. I have found that the precipitant in the form of a thin creamy mud is easily applied and distributed uniformly throughout a body of emulsion but I also found that such a precipitant if originally used in the form of a mud well wetted with water is more efficient after it has become well soaked with oil and the previously absorbed water displaced. However, and this is especially noticeable when using fuller's earth, the completely dry precipitant gives in some cases the best results.

Some emulsions may be broken up and the water caused to settle by a mere application of such a precipitant, the precipitant being preferably distributed evenly throughout the mass by suitable agitation or stirring. The action of the precipitant is not quite fully understood; but it results in the breaking up of the emulsion which allows the water particles to coalesce and allows the water to settle. However in practically every case it is desirable to warm the emulsion so as to increase its fluidity and thus increase the speed of settling of the water, and in some cases where the emulsion is very greatly lacking in fluidity it is practically necessary to warm the emulsion in order to obtain practical results. However, in any case, the action of the precipitant is the same in breaking up the emulsion and allowing the water to settle.

The precipitant which I use in this method (without being necessarily in combination with the other methods I herein set forth) is preferably of a smooth and soft character rather than of a hard and sharp character (more of a clay nature than of a nature like sand or broken glass), and furthermore it is preferably an earth having a certain amount of absorbent qualities, such as fuller's earth has.

However, in using such a precipitant in combination with the heat and pressure method or in combination with the solvent method the precipitant is not necessarily restricted to the particular and specific kinds herein preferably set forth. It may be, in such cases, any precipitating substance. In the patent which I have referred to hereinabove I have set forth generally a method of cleaning such emulsion by heating up to a temperature somewhat around or somewhat above the normal boiling point of water and, holding the liquid under a pressure just substantially sufficient to prevent the free vaporization of the water, and thus causing the emulsion to break down. The water will then settle out; or I may apply additional pressure and hasten the settling of the water. I have in that patent spoken of and claimed generally the combination of such a process with a mechanical precipitant but in that patent I have not specifically described the particular nature of the precipitant which I herein describe—a precipitant of a soft, smooth, finely divided nature rather than one of a hard and sharp nature, more specifically one of a clayey or absorbent nature. The use of this particular kind of precipitant and its combination with the application of heat and pressure are reserved to this present application. In making such a combination I proceed as hereinbefore described and I usually mix the mechanical precipitant, which in this particular case may preferably be in the form of a mud, with the emulsion before introducing the emulsion to the heating container. The introduction of the emulsion to the heating container serves to agitate the emulsion so as to mix the precipitant very thoroughly with it. The admixture is then heated to a temperature somewhat around or somewhat above the normal boiling point of water and a pressure is held thereon just substantially sufficient to prevent free vaporization of the water; that is, a little more pressure than the water-vapor pressure corresponding to the temperature being used. At the same time the pressure is not great enough to prevent vaporization of the lighter hydrocarbons, which hydrocarbons are vaporized and pass upwardly through the liquid and thus tend to agitate the liquid and more thoroughly distribute the mechanical precipitant. After holding these conditions for a certain length of time, the length of time depending upon the character of the emulsion, varying from a few minutes to thirty minutes or more, the water is then allowed to settle out of the emulsion. The mechanical precipitant which I herein describe assists and accelerates this settling very materially. And furthermore, if further vaporization is more or less prevented in the body of the liquid during the settling action, as by increasing the pressure over the liquids without increasing the temperature, the settling is also further accelerated. In this combination process the use of a clayey, absorbent, finely divided, smooth and soft precipitant gives improved results just as it gives improved results where the precipitant process is used alone without combination with the heat and pressure process.

In my application Serial No. 278,728, filed Feb. 24, 1920, co-pending herewith, I have explained and claimed a solvent process for separating hydrocarbons and water from an emulsion mixture. This solvent process may also be used in combination with the present precipitating process and the solvent process may further be used in combination with the heat and pressure process. In fact, all three of these different processes—the heat and pressure process, the solvent process and this precipitating process—may be used in combination. I have explained in said last mentioned application how the solvent process may be used in combination with the heat and pressure process and I have in that application claimed such combination.

In carrying out this combined process the precipitant is used as has been hereinbefore generally stated; but preferably I use the kind of precipitant herein stated to be specifically preferable. Such a precipitant is preferably introduced to the emulsion before or as it goes under the influence of the solvent. In a practical operation of the process I may introduce the precipitant and the solvent to the emulsion at about the same time. The solvent is preferably some substance which will form a solution with both oil and water. I find that either alcohol (either ethyl or methyl) or acetone forms a suitable substance, as either of these liquids is miscible with water and to a certain extent dissolves hydrocarbons. The action will therefore, among other possible things, weaken or loosen the film tension and thus release the water and allow the small particles of water to coalesce to form a larger body or allow the small particles of water to directly settle toward the bottom. The water having thus been released by the action of the solvent, or by the combined action of the solvent and mechanical precipitant, the mechanical precipitant then hastens the settling of the water. Some agitation or stirring of the mixture is desirable after the introduction of the precipitant and the solvent in order to thoroughly distribute both of them and it is also preferred to warm the admixture in order to increase its fluidity and thus allow the water to be released and settled more quickly. The amount of such solvent added to the mixture may vary with different emulsions but on the average it may be about 1 barrel of solvent to 100 barrels of emulsion.

The amount of mechanical precipitant used may vary with the character of the emulsion and the character of the precipitant but as an illustration I may use 2 barrels of thin creamy mud precipitant formed of clay to 500 barrels of emulsion; or in the case of use of fuller's earth I may use 50 pounds or more of such earth to 500 gallons of emulsion. When the water has settled out the precipitant always goes to the bottom with it and may then be separated from the water by settling and then be re-used. As I have before indicated the oil soaked precipitant is preferred to the originally water soaked, where the precipitant is originally in the form of mud. And the dry precipitant, especially in the case of fuller's earth, is also preferred.

In my estimation the two different methods of heat and pressure, and solvent, are in part at least, different methods of weakening or destroying the film tension of the water or of the water and oil, and of thereby weakening or more or less entirely obliterating the confining film or film which separates the liquids into minute particles. When once the film tension is more or less done away with then the mechanical precipitant aids materially in the work of settling the water.

Having described a preferred form of my invention, I claim:

1. In a process for separating hydrocarbons and water from a mixture thereof, admixing with such mixture a finely divided precipitant of a clayey nature, and settling out the water and precipitant together from the hydrocarbons.

2. In a process for separating hydrocarbons and water from a mixture thereof, admixing with such mixture a finely divided precipitant of a clayey nature, settling out the water and precipitant together from the hydrocarbons and recovering the wetted precipitant for re-use in the process.

3. In a process for separating hydrocarbons and water from a mixture therof, admixing with such mixture a finely divided precipitant of a clayey nature, settling out the water and precipitant together from the hydrocarbons, and recovering the precipitant and water in the form of a thin mud and re-using it in that form in the process.

4. In a process for separating hydrocarbons and water from a mixture thereof, admixing with such mixture a precipitant in the form of a clay mud thin with water.

5. In a process for separating hydrocarbons and water from a mixture thereof, admixing with such mixture a precipitant in the form of a clay mud thin with water, then allowing the water and precipitant to settle, removing the water and preciptant and recovering the precipitant for re-use in the process.

6. In a process for separating hydrocarbons and water from a mixture thereof, admixing with such mixture a finely divided absorbent clay, then heating the admixture and allowing the water and precipitant to settle.

7. In a process for separating hydrocarbons and water from a mixture thereof, admixing with such mixture a finely divided absorbent clay, then heating the admixture under a pressure sufficient to prevent vaporization of the water but allowing vaporization of the lighter hydrocarbon constituents, whereby the water is released, and the preciptant is distributed through the mixture, and then allowing the water and precipitant to settle.

8. In a process for separating hydrocarbons and water from a mixture thereof, admixing with such mixture a finely divided absorbent clay, weakening the surface tension of the bodies of water and oil, and separating the water and the oil.

9. In a process for separating hydrocarbons and water from a mixture thereof, admixing with such mixture a finely divided absorbent clay, weakening the surface tension of the bodies of water and oil without allowing the water to vaporize, and separating the water and the oil.

In witness that I claim the foregoing I have hereunto subscribed my name this 10th day of February 1919.

WALTER ARTHUR BROWN.

Witness:
V. BERINGER.